Figure 1:
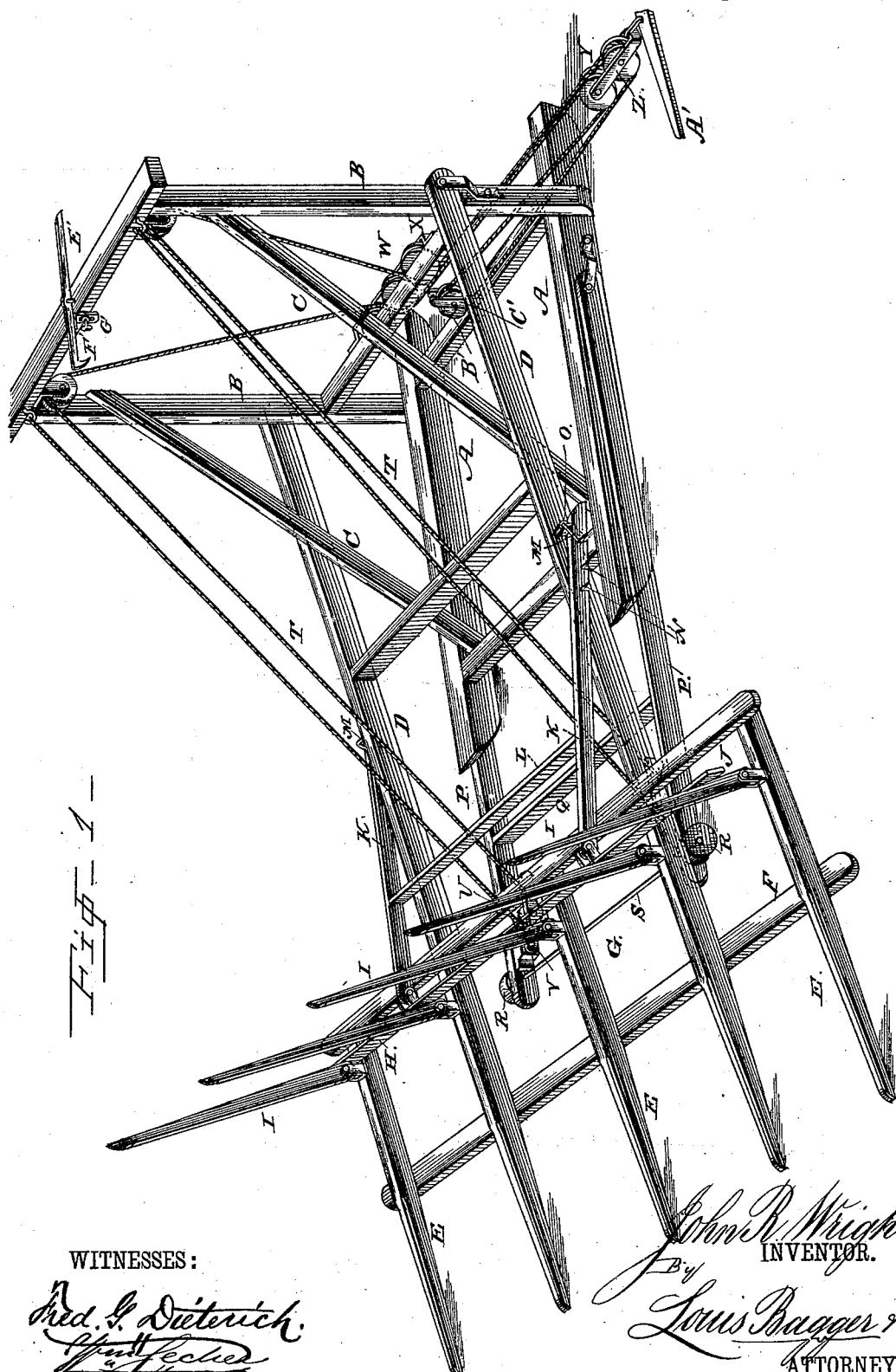

(No Model.)  3 Sheets—Sheet 1.

J. R. WRIGHT.
HAY STACKER.

No. 297,099.  Patented Apr. 15, 1884.

WITNESSES:
Fred. G. Dieterich

John R. Wright
INVENTOR.
By Louis Bagger & Co.
ATTORNEYS.

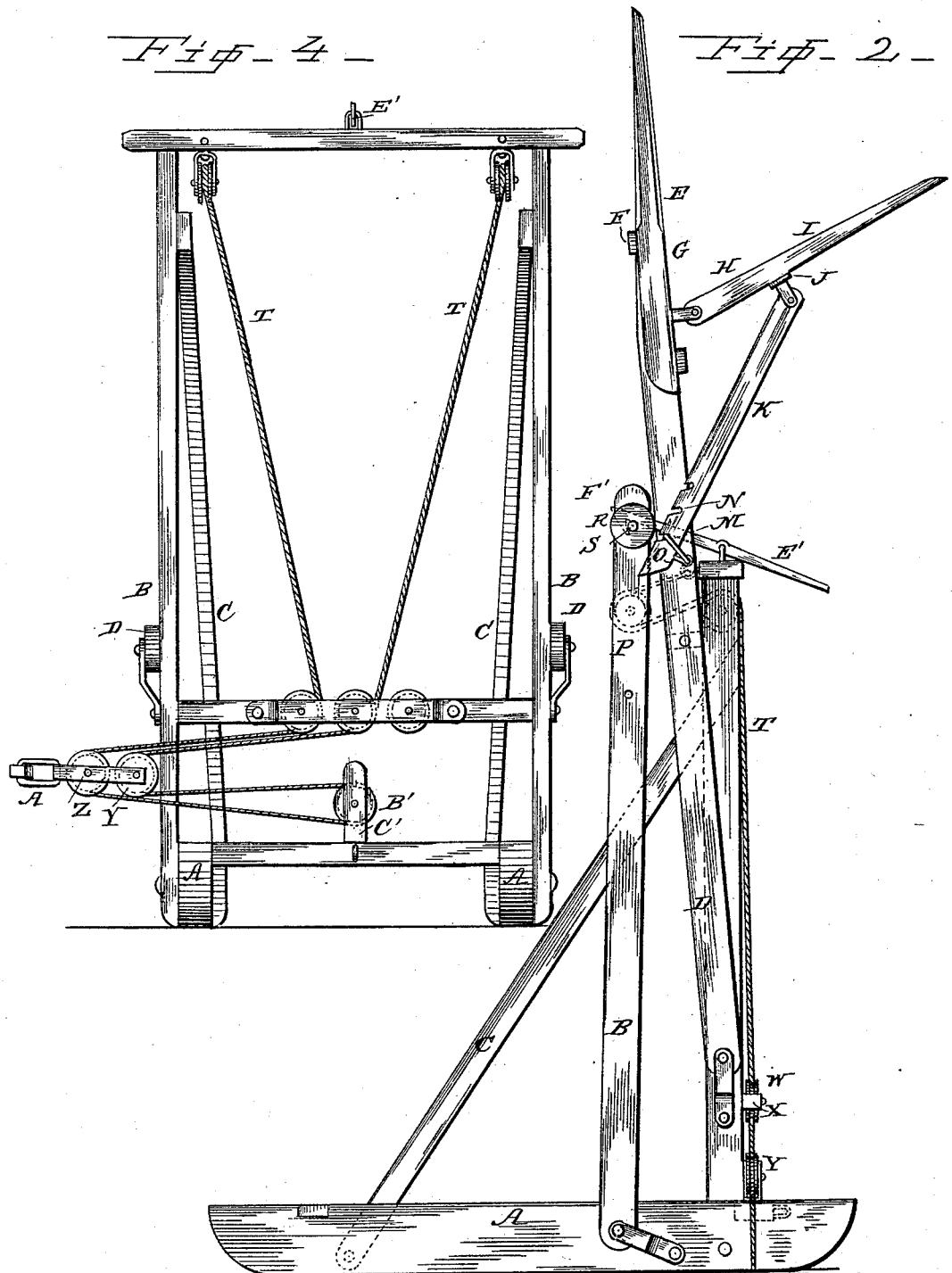

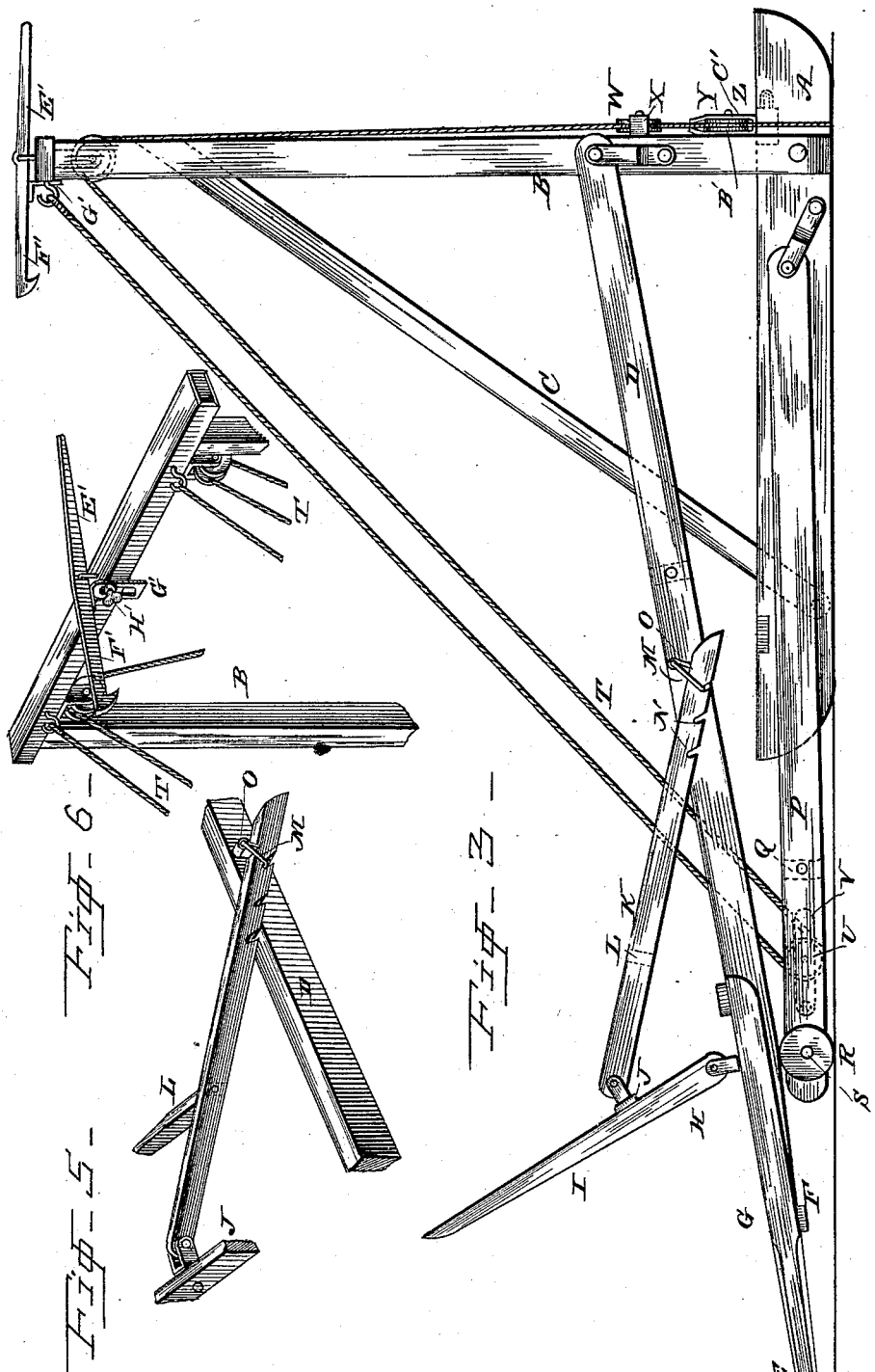

UNITED STATES PATENT OFFICE.

JOHN R. WRIGHT, OF WHEELING, MISSOURI.

HAY-STACKER.

SPECIFICATION forming part of Letters Patent No. 297,099, dated April 15, 1884.

Application filed January 10, 1884. (No model.)

*To all whom it may concern:*

Be it known that I, JOHN R. WRIGHT, a citizen of the United States, and a resident of Wheeling, in the county of Livingston and State of Missouri, have invented certain new and useful Improvements in Hay-Stackers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved hay-stacker. Figs. 2 and 3 are side views, showing the carrier raised and lowered. Fig. 4 is a rear view of the same, and Figs. 5 and 6 are detail views.

Similar letters of reference indicate corresponding parts in all the figures.

My invention has relation to that class of hay-stackers in which the hay is dumped from a hay-rake upon a carrier secured upon the outer ends of pivoted arms, which are thereupon raised, lifting and throwing the hay upon the top of the stack; and it consists in the improved construction and combination of parts of such a stacker, as hereinafter more fully described and claimed.

In the accompanying drawings, the letters A A indicate two parallel skids, upon which the stacker is mounted, and which may be drawn along the ground from one place to another when it is desired to move the stacker. Two uprights, B B, are secured near one end of the skids, and are braced by two inclined braces, C C, secured near the upper ends of the uprights and to near the forward ends of the skids.

D D are the carrier-arms, which are pivoted at their rear ends upon the uprights a short distance from the lower ends of the same, and the outer or forward ends of the said arms are pointed to correspond in shape with a number of teeth or short bars, E, secured at and near their inner ends to two transverse bars, F, which are secured to the carrier-arms, the said teeth and the ends of the carrier-arms forming a rake-shaped carrier-frame, G, which will rest upon the ground when the carrier-arms are in their down position, allowing the hay, which is gathered with a horse hay-rake, to be deposited upon the same.

A frame, H, composed of a number of teeth, I, hinged at their ends upon the upper sides of the carrier-teeth near their inner ends, and connected by a cross-bar, J, serves to hold the hay upon the carrier-frame, having two rearwardly-extending arms, K, hinged at their forward ends to the cross-bar, connected by a small cross-bar, L, and sliding with their rear free ends in two bails, M, upon the outer sides of the carrier-arms, having a number of rearwardly-inclined notches, N, which are adapted to engage the lower ends of the bails, while two short pawls or hinged catches, O, are hinged at the upper ends of the bails, bearing with their free ends against the upper edges of the hinged arms, preventing them, together with the notches, from sliding rearward, while they will allow the arms to slide forward. In this manner the arms may hold the hinged frame in any desired position, and when it is desired to draw the arms and the frame with them to the rear the catches are raised and the notches disengaged from the lower ends of the bails, when they may slide freely.

The lifting-arms P P, which serve to raise the carrier-arms, are hinged upon the outer sides of the skids, a short distance from the uprights, connected near their outer ends by means of a cross-bar, Q, and provided at their outer ends with two rollers, R, journaled outside the ends of the arms upon a transverse shaft, S, passing through the ends of the lifting-arms. These rollers bear against and travel upon the lower edges of the carrier-arms when the lifting-arms are raised; and it will be seen that the rollers near which the draft is applied are nearest to the load when the latter is farthest away from the fulcrum of the lifting-arms, and that the said rollers, as the load is raised and thus brought nearer to and at last immediately above the fulcrum, will travel farther in away from the load, thus making the draft required to raise the load the same at all stages of elevation of the load.

The rope T, to which the draft is applied, is secured at both ends to the upper ends of the uprights, whereupon the two halves pass over two pulleys, U, journaled in brackets V, having guide-fingers for the rope, and secured at the outer ends of the lifting-arms, thereupon over two pulleys secured at the upper ends of the uprights, then over two of a set of three pulleys, W, journaled upon the middle of the rear side of a cross-piece, X, between the lower portions of the uprights, then over two pulleys, Y, journaled in a block, Z, to which the single-tree A', to which the draft is applied, is attached, and at last with the doubled end of the rope over a pulley, B', journaled in a swiveled block, C', upon the middle of a cross-piece, D', between the rear ends of the skids. It will be seen that the two halves of the rope passing between the three pulleys, and the doubled end passing over the swiveled pulley, the draft may be carried to either side of the machine, and the doubled end of the rope passing over the swiveled pulley serves to equalize the draft upon both halves of the rope, preventing one side of the carrier-frame from being drawn up faster than the other, which may happen in stackers, where each side has its own rope, by the rope upon one side becoming stretched or caught.

For the purpose of holding the carrier-frame elevated in topping off the stack when the entire load may not be dumped at once, a lever, E', forming a catch, F', at its forward end is pivoted upon the cross-piece connecting the upper ends of the uprights, and may engage the transverse shaft at the ends of the lifting-arms, and the said catch-lever may be set either with its end raised so high that it will not catch the shaft, or in such a position that it will catch the shaft, by means of a slotted plate, G', sliding with its slot upon a set-screw, H', upon the forward side of the cross-bar, and bearing with its upper end against the lower edge of the catch-lever.

The operation of my hay-stacker will readily be understood by the foregoing description, taken in connection with the accompanying drawings, without any further explanation.

Having thus described my invention, I claim and desire to secure by Letters Patent of the United States—

1. The combination of the carrier-arms, means for elevating them, the frame hinged upon the upper side of the carrier-arms, the arms hinged to the rear side of the hinged frame connected by a cross-bar, and having the inclined notches in their lower edges, the bails upon the outer sides of the carrier-arms, and the catches or pawls hinged upon their upper ends, as and for the purpose shown and set forth.

2. The combination of the frame, the draft-rope attached to the upper ends of the frame at both ends, the lifting-arms having pulleys at their outer ends, the pulleys at the upper ends of the uprights, the three pulleys upon the cross-piece at the lower portion of the frame, the block having the single-tree attached to it, and the swiveled block or pulley having the doubled end of the rope passing over it, as and for the purpose shown and set forth.

3. The combination of the uprights connected at their upper ends by a cross-piece, the lifting-arms having the transverse shaft at their outer ends, the catch-lever pivoted to the cross-piece at the upper ends of the uprights, a set-screw at the forward side of the cross-piece, and the slotted plate sliding adjustably upon said set-screw, as and for the purpose shown and set forth.

4. The hay-stacker consisting of the skids, the uprights, the carrier-arms pivoted upon the uprights near their lower ends, the lifting-arms pivoted upon the skids near their rear ends, the frame hinged upon the upper side of the carrier and having means for adjusting it, the pulleys at the ends of the lifting-arms and at the ends of the uprights, the three pulleys at the lower rear portion of the frame, the block having two pulleys and the single-tree, the swiveled pulley, and the rope passing over the pulleys and secured at both ends to the upper ends of the uprights, all constructed and arranged as and for the purpose shown and set forth.

In testimony that I claim the foregoing as my own I have hereunto affixed my signature in presence of two witnesses.

JOHN R. WRIGHT.

Witnesses:
GEO. B. ARNOLD,
ED. SCRUBY.